United States Patent [19]

Moore et al.

[11] 4,350,455
[45] Sep. 21, 1982

[54] HIGH SPEED BASIC AND CONDENSED TAB RACKS

[75] Inventors: Daniel J. Moore; Robert A. Pascoe, both of Austin, Tex.

[73] Assignee: International Business Machines Corp., Armonk, N.Y.

[21] Appl. No.: 107,238

[22] Filed: Dec. 26, 1979

[51] Int. Cl.³ .............................................. B41J 25/18
[52] U.S. Cl. ..................................... 400/279; 364/900
[58] Field of Search ................... 400/76, 279; 364/200, 364/900

[56] References Cited

U.S. PATENT DOCUMENTS

| | | | |
|---|---|---|---|
| 3,832,697 | 8/1974 | Kashio | 400/279 X |
| 3,885,663 | 5/1975 | Suzuki | 400/279 |
| 4,031,996 | 6/1977 | Busch | 400/279 |
| 4,131,949 | 12/1978 | Fletcher et al. | 400/279 X |
| 4,178,108 | 12/1979 | Kane | 400/144.2 |
| 4,212,553 | 7/1980 | Acosta et al. | 400/279 |

OTHER PUBLICATIONS

IBM Technical Disclosure Bulletin, "Method of Tab Storage", Bowles et al., vol. 17 No. 1 Jun. 1974, pp. 131-132.

*Primary Examiner*—Ernest T. Wright, Jr.
*Attorney, Agent, or Firm*—Andrea P. Bryant

[57] ABSTRACT

In a high speed trail printer an improved electronic tab rack is provided. A method and apparatus are disclosed for decreasing the time required to determine the location of the next tab involving accessing a condensed tab rack. The condensed tab rack is set up when the tabs are entered and contains for each byte of the basic tab rack one bit indicating whether or not the associated tab rack byte specifies at least one tab stop position.

5 Claims, 6 Drawing Figures

HIGH SPEED BASIC AND CONDENSED TAB RACKS

BACKGROUND OF THE INVENTION

1. Field of the Invention

This invention relates generally to electronic tab racks. More specifically, the invention relates to accessing tabs set in an electronic tab rack in a high speed processor controlled printer.

2. Description of the Prior Art

The most pertinent prior art relating to electronic tab racks is the widely known method of setting one bit for each possible escapement position in an electronic tab rack memory as disclosed in U.S. Pat. No. 4,031,996 to Busch, assigned to the same assignee as the instant application. Thereafter, during printing when the print controller receives a tab signal, a search is initiated to find the next bit in the memory indicating the next escapement position. This search is conducted by serially looking at each bit in the tab rack. The horizontal motion then required of the print mechanism carrier is calculated as the difference between the next tab position and the present position of the print mechanism and moved accordingly. For typewriters and slow interactive printers this search technique is adequate. However, a bit-by-bit search requires time not available in high speed trail or output printers, such as those used in word processing applications.

SUMMARY OF THE INVENTION

It is therefore, a primary object of this invention to overcome the aforementioned disadvantage of the prior art by decreasing tab stop search access time in an electronic tab rack.

It is an object of this invention to determine tab stop location in an improved manner using a condensed tab rack.

A novel improvement in electronic tab racks in accordance with the present invention comprises a second, condensed tab rack where one bit represents the logical OR of one multibit block of the complete, or basic, tab rack. The condensed tab rack is an addressing expedient for the basic tab rack which enables search time for the next tab stop to be decreased since fewer bits must be examined. The present invention facilitates determination of the location of the next tab by first checking the currently accessed basic tab rack block for any more tabs, then the condensed tab rack for the next "1" bit, which may indicate a block quite removed from the present one.

The foregoing and other objects, features and advantages of the instant invention will be apparent from the following more particular description of a preferred embodiment, as illustrated in the accompanying drawing.

DESCRIPTION OF THE PREFERRED EMBODIMENT

Figure 1:
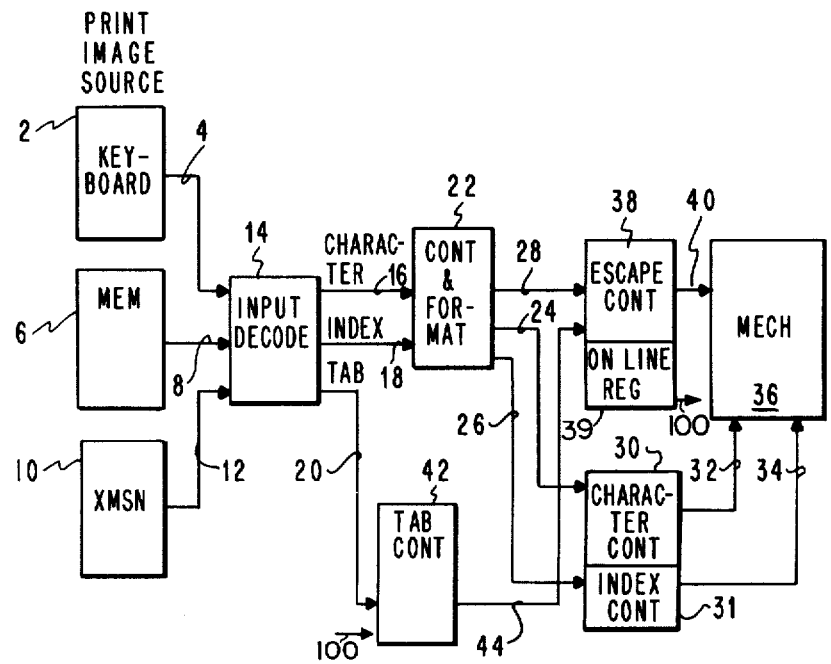
FIG. 1 is a block diagram of the overall system in which the instant invention operates.

Referring now to FIG. 1, the system will be described. The instant invention is utilized in the control of high speed printers, for example, in word processing systems. Such a printer is disclosed in U.S. Pat. No. 4,178,108, issued Dec. 11, 1975 to Milburn H. Kane and commonly assigned. It describes a printer suitable for use with the present invention. That printer includes horizontal moving means 7 for a carrier 1. Input to the system of FIG. 1 may come from one of several sources such as directly from a keyboard 2, a memory 6, or over transmission line 10. Any of these three represents a print image source, and this image is conveyed over lines 4, 8 or 12 to input decode logic block 14. No great detail is thought necessary to be set forth as this is conventional in the printer control art. Outputs from logic block 14 include indications of whether a particular data stream is a character on line 16, an index code on line 18, or a tabulate control code on line 20. Character and index codes on lines 16 and 18, respectively, are input to control and format logic 22 which preprocesses the data received on lines 16 and 18 for compatibility with the device. Format logic 22 then converts this data to control sequences recognized by the printer mechanism. Again, this is conventional and well understood by those skilled in the art. Outputs on lines 24 and 26 are fed to logic blocks 30 and 31 which execute the control sequences from format logic 22. The outputs of logic blocks 30 and 31 on lines 32 and 34, respectively, go to the printer mechanism itself, represented by block 36. Line 28 is the third output from control and format logic 22 and is input to escapement control logic block 38 which interacts with the printer mechanism block 36 over line 40.

The present invention is more particularly related to tabulation control as determined in input logic block 14 in a high speed printer control. Any tabulation control signal decoded in input logic block 14 is output on line 20. Line 20 is actually a plurality of lines which contain any data necessary to describe the tabulation function. These include the location of tab stops for the current document (tab rack image) and the requirement to tab (tab character). Line 20 is input to tabulation control block 42 which has an output on line 44 to escapement control logic block 38. Escapement control logic block 38 includes on line register 39. Blocks 14, 22, 42, 30, 31 and 38 can be implemented in either logic or microcode or an integration of both.

Figure 2:
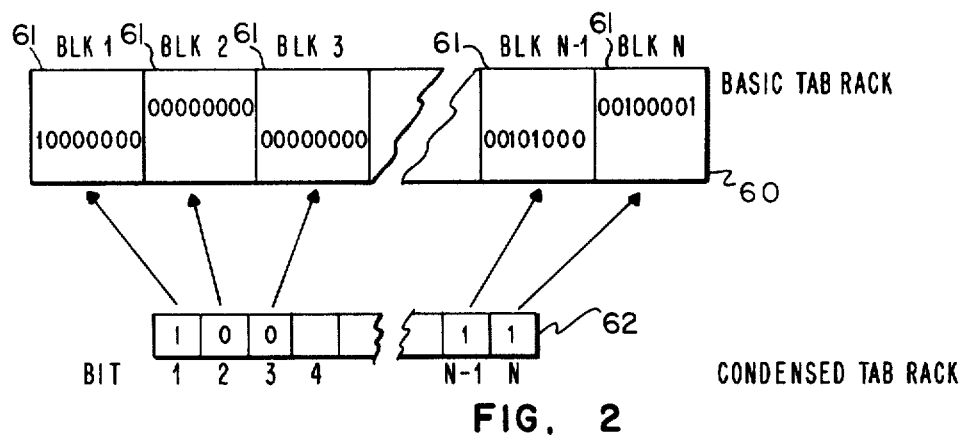
FIG. 2 schematically illustrates the structure and relationship between the basic and condensed tab racks.

FIG. 2 schematically illustrates the relationship between the basic tab rack 60 and the condensed tab rack 62 of the instant invention. The basic tab rack, indicated generally at 60, consists of N blocks 61 where each block 61 contains an equal number of bits. Condensed tab rack 62 has one bit for each block 61 that is present in basic tab rack 60. Each corresponding bit in condensed tab rack 62 is set "ON" if at least one bit is on in its correlative block 61 in tab rack 60. Whether any given bit in condensed tab rack 62 is "ON" or "OFF" simplifies the search through basic tab rack 60 since all bits in the corresponding basic tab rack block 61 may be skipped for every zero found in the condensed tab rack 62. While the invention has been described in terms of eight bit bytes it is, of course, understood by those skilled in the art that other convenient byte or block sizes may be used without departing from the scope of the invention.

Figure 3:
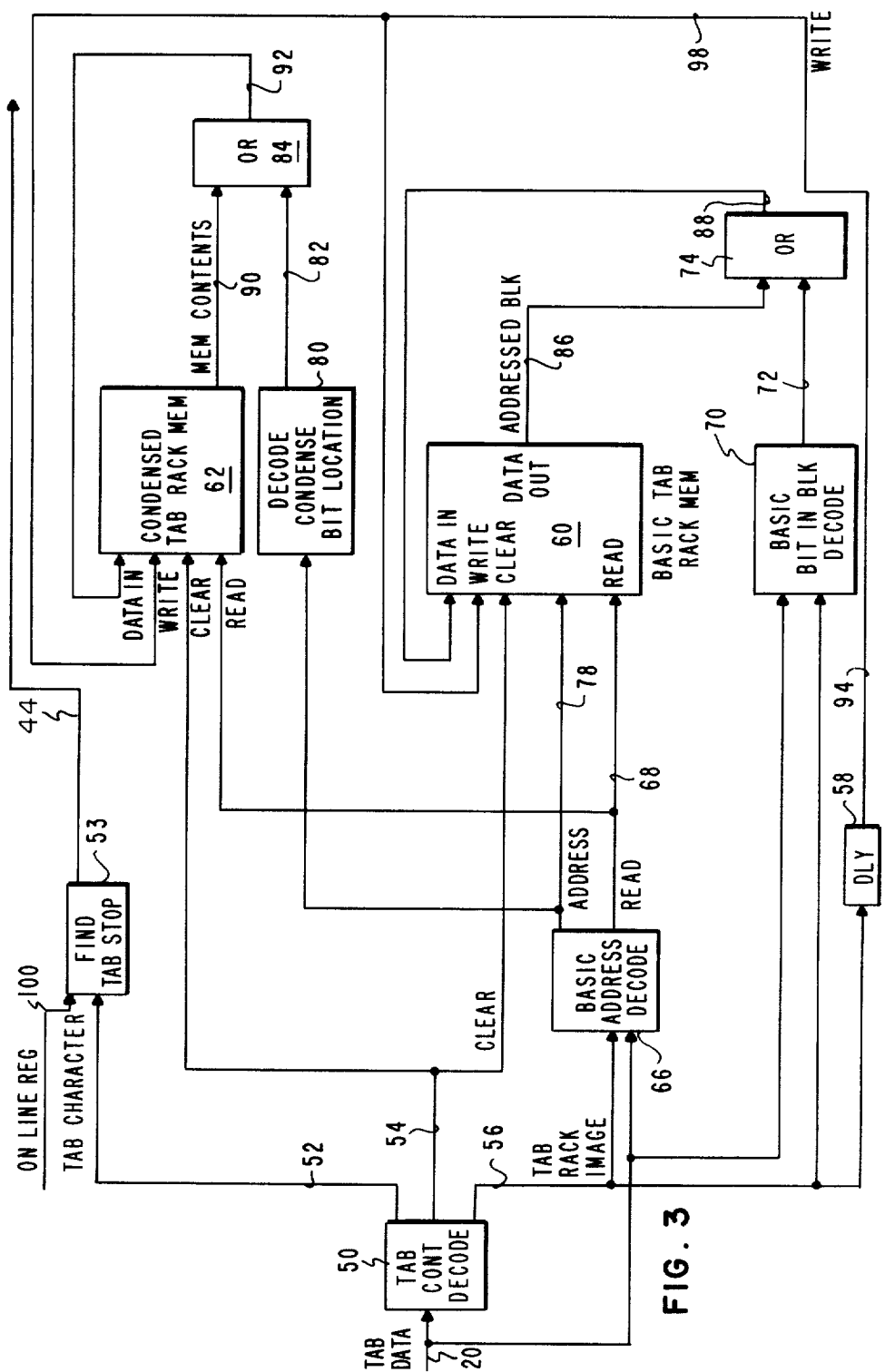
FIG. 3 is a block diagram of the tab rack setup.
Figure 4:
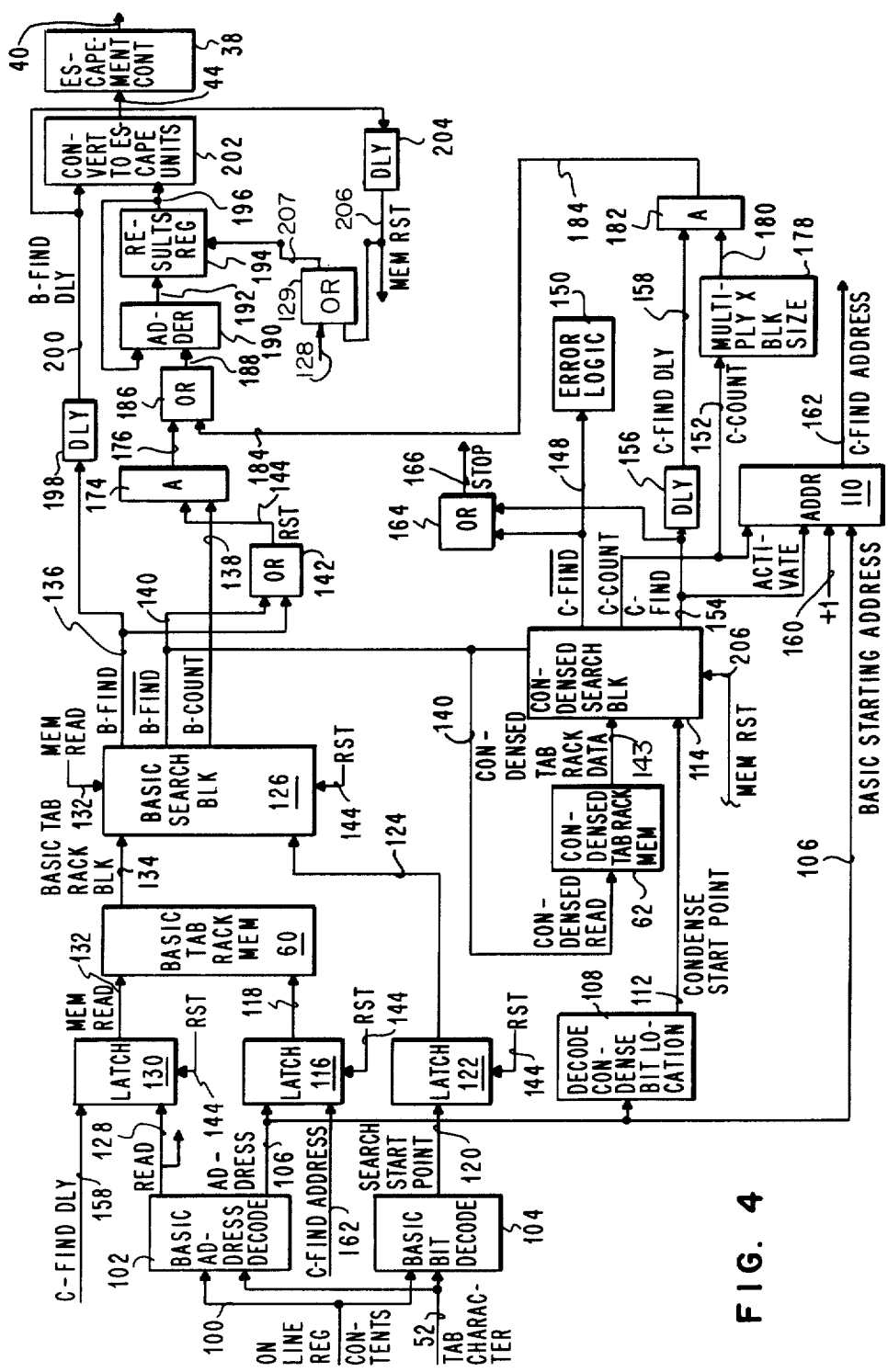
FIG. 4 is a block diagram of the find tab stop logic block 53 of FIG. 3.
Figure 5:
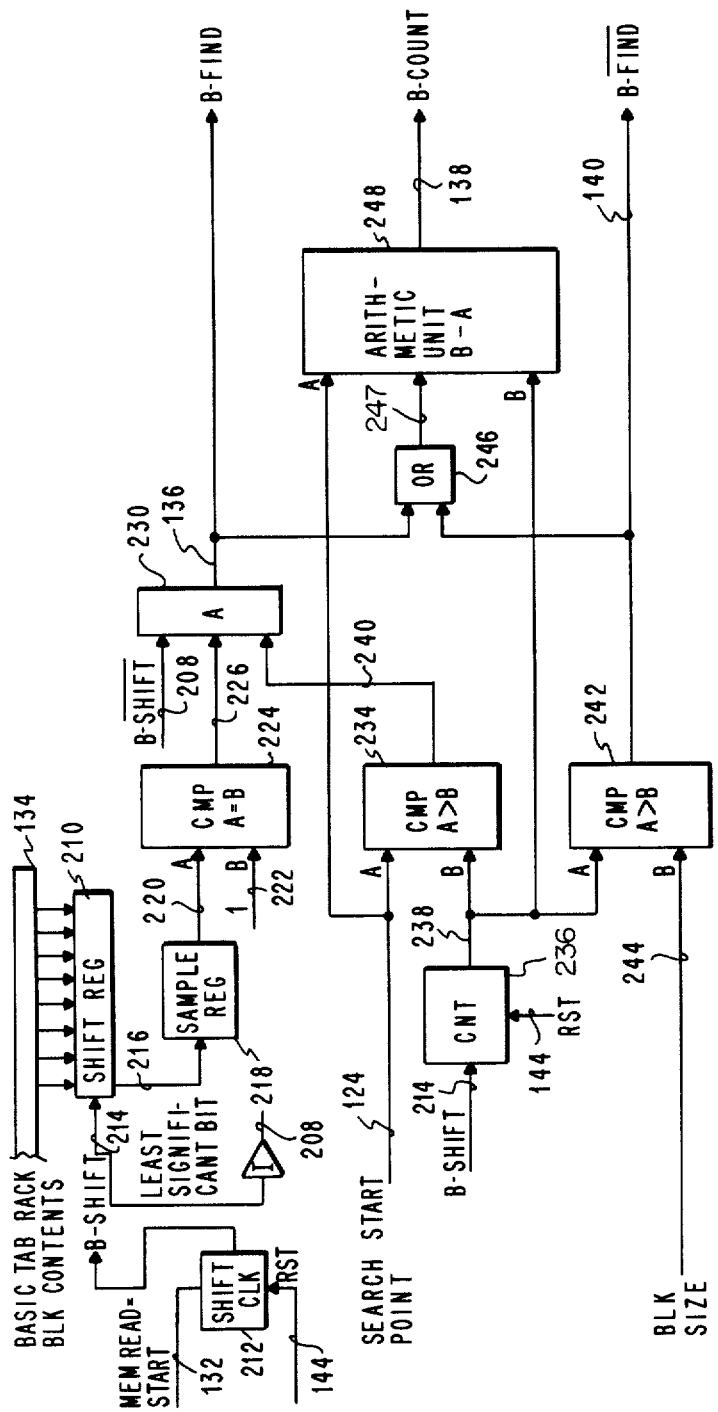
FIG. 5 shows the logic details of basic tab rack search logic 126 in FIG. 4.

FIGS. 3, 4 and 5 together make up the tab control logic indicated by block 42 in FIG. 1. Referring now to FIG. 3, a more detailed description of logic block 42 in FIG. 1 will be presented. FIG. 3 shows the logic used to set up the schematically illustrated tab racks 60 and 62 in FIG. 2 which correspond to basic tab rack memory 60 and condensed tab rack memory 62 in FIG. 3. Tab control decode logic 50 utilizes input on line 20 to determine whether the tab indication is a tab character, a tab rack image, or a clear signal and to output such on lines 52, 56, and 54, respectively. On line 52 is a tab character indication and it will be processed by logic 53 shown expanded and described in connection with FIG. 4. Clear signal on line 54 is input to clear basic tab rack memory 60 or condensed tab rack memory 62. Tab rack image on line 56 indicates that the positions at which tabs are desired to be set is currently present on line 20; line 56 is input to delay 58 as well as basic tab rack address decode logic 66 and the basic bit in block decode 70. A second input to basic address decode logic 66 and basic bit in block decode logic 70 is line 20. The basic address decode logic 66 will be activated by the tab rack image signal on line 56 and will decode the signal on line 20 into the associated address in the basic tab rack memory 60 and then control the fetching of this decoded location from that memory 60.

There are two outputs from decode logic 66: one output is a read signal on line 68 for reading from basic tab rack memory 60 and from the condensed tab rack memory 62. Tab rack image on line 56 also activates decode logic block 70 for determining in which bit within the basic tab rack block 61 (FIG. 2) addressed by logic block 66 is the bit representing where a tab is desired to be set. As noted, logic block 70 is activated by a signal on line 56 and decodes the data on line 20. Output on line 72 is a plurality of signals equal in number and format to one basic tab rack memory block 61 (FIG. 2). Each signal is zero with the exception of that signal representing the bit decoded by block 70. This bit is a one. Output line 72 is one input to OR gate 74. It is to be noted here that details of the read/write control from memories 60 and 62 is not described as it will be appreciated to be conventional by those skilled in the art.

The other of the two aforementioned outputs from basic address decode logic 66 is on line 78 and is an address used to access basic tab rack memory 60. This address is also input to logic 80 for decoding the corresponding bit location in condensed tab rack memory 62. The output of decode logic 80 on line 82 is input to OR gate 84. Line 82 is actually a plurality of lines equal in number and format to condensed tab rack memory 62. Each signal is zero with the exception of that signal corresponding to location in condensed tab rack memory 62, as decoded by logic 80.

A multi-bit block 61 of data which has been retrieved from basic tab rack memory 60 is on line 86 and is the second input to OR gate 74. When OR gate 74 is made, there is a signal on line 88 which comes back to the Data In input of basic tab rack memory 60. Similarly, the contents of the bits in condensed tab rack memory 62 which has been fetched by a signal on line 68 makes the second input to OR gate 84 on line 90 resulting in a output signal on line 92 which is the Data In input to condensed tab rack memory 62.

Line 94 has the tab rack image signal which was delayed in delay 58. Line 94 is a Write signal pulse on line 98 which is the Write signal for both basic tab rack memory 60 and condensed tab rack memory 62. Delay 58 is such that the Write signal on line 98 is generated after the memory access to memories 60 and 62 is complete and the ORing process in OR gates 74 and 84 is complete. Thus, the tab rack image is decoded and the corresponding locations in the tab rack memories 60, 62 are fetched, updated, and stored.

FIG. 4 shows details of find tab stop logic 53 from FIG. 3. One input to find tab stop logic 53 is the contents of the on-line register 39 which is a part of escapement control logic block 38 in FIG. 1. The contents of this register 39, which indicates the current escapement position, is on line 100. Both tab character indication on line 52 and data on line 100 are input to decode logic 102 for determining tab block address in the basic tab rack memory 60 and to decode logic 104 for determining bit address within the block 61. The address decoded by logic 102 is on line 106 and is input to decode logic 108 for determining bit location in condensed tab rack memory 62. The address on line 106 is also an input to adder 110.

The decoded address on line 106 is the address in the basic tab rack memory 60 where the search for the next tap stop will be started. The decoded output from decode logic 108 on line 112 is the starting point for searching in the condensed tab rack memory 62. This address on line 112 is one input to condense tab rack memory search block logic 114 which will be described in detail with reference to FIG. 6.

The decoded address in the basic tab rack memory 60 on line 106 is also input to set latch 116 in order to maintain this address through the memory operation. Output of latch 116 on line 118 is used to access a block 61 in basic tab rack memory 60.

Basic bit decode logic 104 is provided for decoding tab character information on line 52 to determine the search starting point within the basic tab rack memory 60 addressed by line 106. Therefore, when a tab character is decoded on line 52, the current escapement position of the printer on line 100 is used to determine the location in the basic and condensed tab rack memories 60 and 62, respectively, via decode logic 102, 104 and 108. In addition, the block of data within the basic tab rack memory 60 is fetched and presented to the search logic 126. Logic 104 places this information on line 120 which sets latch 122 in order to allow this value to be maintained during the search operation. This search start address is fed by line 124 from latch 122 to logic 126. Logic 126 is the search basic tab rack memory 60 logic and is described in detail below in connection with FIG. 5.

The other output from basic address decode logic 102 is a Read command on line 128 which sets latch 130 and is held through the Read operation. Output from latch 130 is the memory read command MEMREAD on line 132 which is used to retrieve from basic tab rack memory 60 a multibit block of data and place it on line 134. Data on line 134, which along with MEMREAD on line 132, is input to search logic 126.

Outputs from search logic 126 include a signal BFIND on line 136 indicating if another tab stop has been found in the block 61 of basic tab rack memory 60 currently being accessed. A signal BCOUNT on line 138 gives the count of the tab location searched before the tab stop was found or the count of tab locations searched by the time the block 61 was completely searched without finding a tab stop. The third possible output from search logic block 126 is a signal BNOTFIND on line 140 which indicates that no other bits were found to be on in the currently accessed multi-bit block 61 from basic tab rack memory 60. A signal on line 140 thus means there is a need to search in condensed tab rack memory 62 to obtain a pointer to the next block 61 in basic tab rack memory 60 having a bit set "on". Signals on lines 136 and 140 are the inputs to OR gate 142 which produces a reset signal RST on line 144 to reset latches 116, 122, and 130, and search logic 126 which hold the basic tab rack memory 60 address, search start point, memory read signals and basic search block signals, respectively. That is, the read operation activated by a signal on line 52 as described above is reset when the search operation of search logic block 126 is complete.

The BNOTFIND signal output on line 140 from search logic 126 is also an input to the read input of the condensed tab rack memory 62. Therefore, the contents of the condensed tab rack memory 62 is passed via line 143 to the condensed search block logic 114 when there are no additional tab stop locations found by search logic 126.

Output from condensed search block logic 114 may be one of three signals. If no bit was found "ON" in the condensed tab rack data searched, a signal CNOTFIND on line 148 so indicates. This signal is input to error logic 150 which may communicate with the printer operator in any desired manner. The second possible output from logic 114 is a count of bits passed in condensed tab rack memory 62 from the search start point indicated on line 112 until a bit was found to be "ON" or the entire memory 62 was searched. The signal carrying this count, CCOUNT, is on line 152. The third output is the CFIND signal on line 154 which indicates that a bit was found "ON" meaning that another block 61 containing at least one tab stop exists in condensed tab rack memory 62.

CNOTFIND on line 148 and CFIND on line 154 are inputs to OR gate 164. The output from OR gate 164 on line 166 is a STOP signal whose function will be described in connection with FIG. 6.

The CFIND signal on line 154 is delayed in delay means 156 in order to allow time for adder 110 to function. The output of delay means 156 called CFINDDLY on line 158 is an input to latch 130 which via the output on line 132 causes a second read of the basic tab rack memory 60. Further, signals on line 152 and line 154 are input to Adder 110. The CFIND signal on line 154 is used to activate Adder 110. The value of CCOUNT on line 152 when Adder 110 is activated is equal to the number of zeros encountered by the search block logic 114. This count will be added to the basic starting address, on line 106, as determined by the current escapement position, on line 100, via decode logic 102. Input line 160 assures that an additional value of one is added to the result to account for the fact that the CCOUNT on line 152 represents only blocks 61 skipped and does not account for the block 61 to be addressed. Thus the output on line 162 of Adder 110 is the address, CFIND, of the block 61 in the basic tab rack memory 60 which contains the next tab stop value. This CFIND output on line 162 becomes an input to latch 116. The CFIND address on line 162 latched in latch 116, coupled with the signal on line 158 latched in latch 130 causes the newly calculated block address in the basic tab rack memory 60 to be fetched, and it is passed along line 134 to the basic search logic 126. The other input to logic 126 on line 124 is zero as latch 122 has been reset by the RST signal on line 144. Therefore the search conducted by search logic 126 will begin at the first bit location and proceed until a one bit is detected. This will result in a signal on line 136 and a count, BCOUNT, on line 138. BCOUNT represents the number of tab locations from the beginning of the block 61 being searched to the first tab stop prescribed by the presence of a one bit.

BFIND and BNOTFIND signals on lines 136 and 140, respectively, are input to OR gate 142 the output of which, RST, on line 144 is one input to AND gate 174. The BCOUNT signal on line 138 is the other input to AND gate 174. The output of AND gate 174 on line 176 forms an input to OR gate 186.

CFIND on line 154 is delayed by delay means 156 and becomes signal CFINDDLY on line 158 and is one input to AND gate 182. CCOUNT on line 152, the number of bits passed in searching through condensed tab rack memory 62, is multiplied by the number of bits comprising a block 61 in multiplier 178. The product, on line 180, represents the number of tab positions skipped while searching condensed tab rack memory 62. Line 180 is the other input to AND gate 182.

Output of AND gate 182 on line 184 is the other input to OR gate 186, the output of which on line 188 is input to Adder 190. The sum computed in Adder 190 is placed on line 192 to go into results register 194 and back into Adder 190 via line 196. Results register 194 is reset when read line 128 is active at the beginning of the cycle. The memory reset signal MEMRST on line 206 and the READ signal on line 128 are input to OR gate 129 which produces an output on line 207 which is applied to reset results register 194. The sum on line 196 is also input to conversion logic block 202 to convert those bits to escapement units. This conversion, of course, is a function of the specific print control system being used.

The other input to conversion logic 202 on line 200 is a delayed BFIND signal BFINDDLY developed by delaying the signal on line 136 in delay means 198. Output from delay means 198 is on line 200 and is input to conversion logic 202. The BFINDDLY signal on line 200 is further delayed in delay means 204 and output on line 206 as a memory reset signal MEMRST and applied to OR gate 129 as described above. The actual number of escapement units output from conversion logic block 202 is on line 44 and is input to escapement control logic block 38 as shown in FIG. 1. MEMRST on line 206 is also used to reset condensed tab rack search logic block 114.

The RST signal on line 144 becomes active when basic tab rack search logic 126 is activated via the first search of the basic tab rack memory 60 (as activated by a decode of the tab character on line 52 in address code logic 102, etc.). Therefore, the results of this search on lines 138 and 144 are gated through AND gate 174 and OR gate 186 and applied to adder 190 via line 188. Since the results register 194 was reset when the search began, the other input to Adder 190 on line 196 is a zero. The result of this add is to place the first search value in the results register 194. Now if the search were successful, BFIND on line 136 would be active.

If the initial search was not successful, this conversion would not take place as no BFINDDLY signal would be generated on line 200. Instead, a search of the condensed tab rack memory 62 would be activated via a BNOTFIND signal along line 140 as described above. If the results of this search result in finding a bit "ON" in the condensed tab rack memory 62, then line 154 is active and the count value CCOUNT on line 152 converted to the number of skipped tab positions by block 178 is gated through AND gate 182 and OR gate 186 to Adder 190. This value is added to the results register 194, (i.e., the value of the initial search of the basic tab rack memory 60) and the results placed back in the results register 194.

Having completed the search of condensed tab rack memory 62, the second search of the basic tab rack memory 60 is initiated as described above via signals along line 158 to latch 130 and line 162 to latch 116. When this search is completed, RST signal on line 144 is active causing the newly determined count value BCOUNT on line 138 to be gated through AND gate 174 and OR gate 186 to Adder 190. This BCOUNT value on line 188 represents the number of tab positions searched in this second search operation. This BCOUNT value is summed by adder 190 to that in results register 194 and the sum is returned to the results register 194. Results register 194 now contains the sum of three values: (1) the number of tab positions in the first basic tab rack memory 60 block 61 searched which contained no tab stop; (2) the number of tab stops skipped as a result of the search of the condensed tab rack memory 62; and (3) the results of the second basic tab rack memory 60 block search which contained a tab stop. This sum is equal to the number of tab positions until the next tab stop. Since a find is guaranteed for this second search, line 136 is active and is delayed through delay means 198 to conversion logic 202 via line 200. Therefore, the sum in results register 194 is converted to escapement units in logic 202 and passed to printer escapement control logic 38 via line 44.

FIG. 5 shows in detail the logic represented by search logic 126 in FIG. 4. The multi-bit block 61 retrieved from basic tab rack memory 60 on line 134 is input in parallel to shift register 210. The memory read signal MEMREAD on line 132 is used to start shift clock 212 so that pulses BSHIFT appear on line 214 for shifting bits out of shift register 210. RST on line 144 is used to stop shift clock 212. Bits are shifted out from shift register 210 onto line 216. The least significant bit is shifted out first to sample register 218. This bit is then output from sample register 218 on line 220 as the A operand to comparator 224. The B operand of comparator 224 is a hard wired one (+1). Output from comparator 224 indicates that the sampled bit was "ON" and this signal on line 226 is input to AND gate 230 along with BSHIFTNOT on line 208, the inverse of the BSHIFT signal on line 214. The other input to AND gate 230 is on line 240 and will be described below. The output of AND gate 230 is the BFIND signal on line 136.

SSP, or search start point signal, on line 124 is the A operand input to comparator 234 which determines whether the A operand is greater than the B operand. SSP, which is in fact a numeric value equal to the location in the block 61 represented by the current carrier position, is also the A operand input to arithmetic unit 248 on line 124. BSHIFT signal on line 214 is also input to counter 236 which determines how many shifts have occurred. Counter 236 output is on line 238 and is the B operand input to comparator 234. Output from comparator 234 on line 240 is the third input to AND gate 230. Shift count on line 238 is the B operand input to arithmetic unit 248, is an input to comparator 234 as the B operand, and is the A operand input to comparator 242.

The B operand for comparator 242 is a constant indicating block size on line 244. The block size constant is the number of bits in a multi-bit block 61 in basic tab rack memory 60 and would, of course, vary in accordance with implementation choices. Comparator 242 puts output on line 140 if shift count is greater than block size. It is BNOTFIND, the signal indicating that no further tab bits were found "ON" in the currently accessed block 61 from basic tab rack memory 60.

BNOTFIND signal on line 140 as well as the BFIND signal on line 136 are the two inputs to OR gate 246, the output of which is the activate signal on line 247 for arithmetic unit 248. Arithmetic unit 248 performs the operation of subtracting the A operand on line 124 from the B operand on line 238, that is, shift count minus search start point. The result is BCOUNT signal on line 138 which tells the number of tab positions searched during this operation.

Comparator 224 searches for a one bit within a block 61 of the basic tab rack memory 60. When a one bit is found beyond the search start point as determined by comparator 234, AND gate 230 is active which puts BFIND signal on line 136 thus indicating a tab stop was found. If a one bit is not found, the count in counter 236 will exceed the block size on line 244 and comparator 242 will place a BNOTFIND signal on activate line 140 thus indicating that no tab stop found. When either of lines 136 or 140 is active, arithmetic unit 248 is activated in order to subtract search start point on line 124 from shift count value on line 238. The difference yields the number of tab positions determined by the search.

Figure 6:
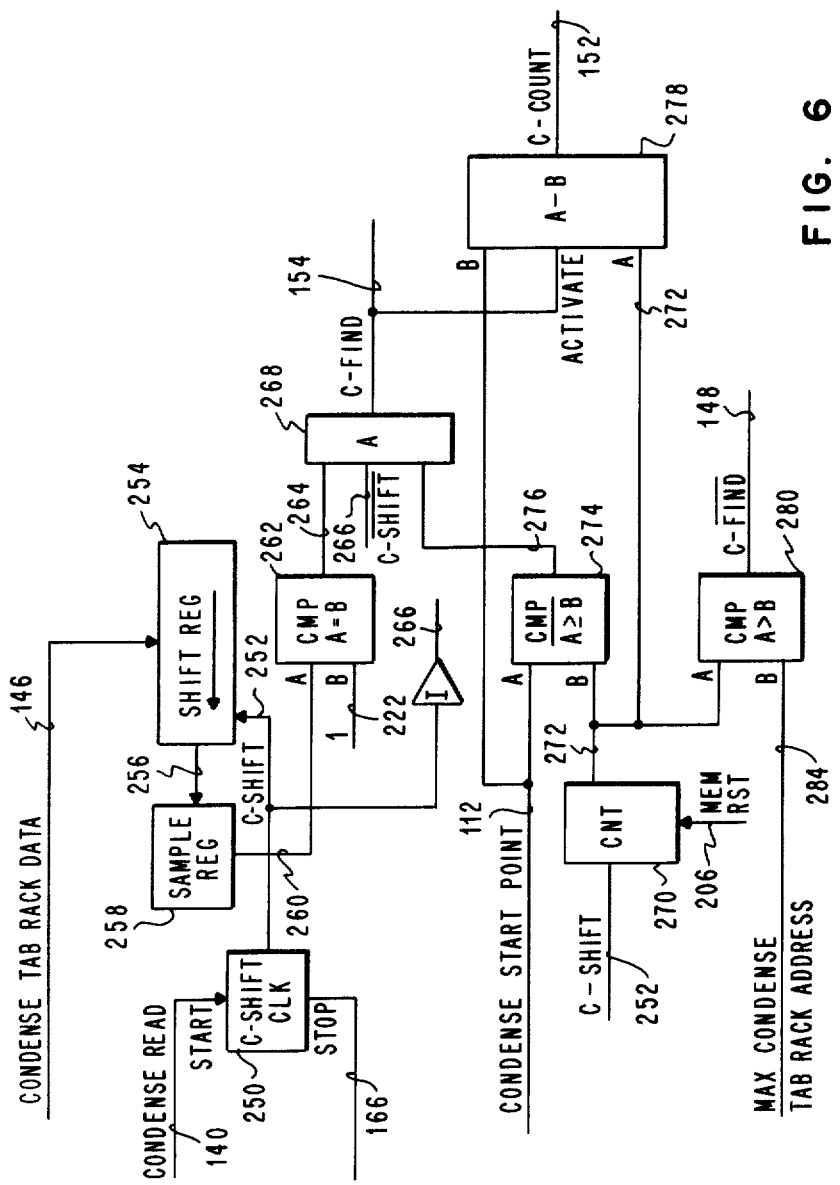
FIG. 6 illustrates the logic of the condensed tab rack search logic 114 in FIG. 4.

FIG. 6 shows the details of block logic 114 from FIG. 4. BNOTFIND on line 140 is also the condensed read signal, indicating that no "ON" bits were found in the currently accessed multi-bit block 61 from basic tab rack memory 60. This signal on line 140 is used to start shift clock 250 placing CSHIFT pulses on line 252. Data from condensed tab rack memory 62 on line 146 is input to shift register 254. A CSHIFT pulse on line 252 causes one bit to be shifted out of the shift register 254 via line 256 to sample register 258. This bit from register 258 goes over line 260 to the A operand input of comparator 262. Comparator 262 requires equal A and B operands before generating an output. The B operand is a constant +1 on line 222. Output from comparator 262 indicates that there is at least one tab set in the corresponding basic tab rack memory 60. This output on line 264 is one input to AND gate 268. Another input to AND gate 268 is the inverse of CSHIFT on line 266. The development of the third input to AND gate 268 on line 276 will be described below. Output from AND gate 268 is the CFIND signal on line 154 which, along with the CNOTFIND signal on line 148, gated through OR gate 164 in FIG. 4, is used to stop the shifting of shift clock 250.

The starting point address for looking in condensed tab rack memory 62 is on line 112. Line 112 is the A operand input to comparator 274 and is also the B operand input to arithmetic unit 278. Comparator 274 compares to determine whether operand A is equal to or greater than operand B, in this case whether the starting point for searching in condensed tab rack memory 62 is higher than or equal to the number of shift pulses. The result of this compare operation is along line 276 applied to AND gate 268. Counter 270 is provided for counting the number of pulses which appear on line 252 from CSHIFT clock 250. This number is output on line 272 and is the B input to comparator 274. This shift count is also input to the A input of arithmetic unit 278 which upon receipt of an activate signal from AND gate 268 on line 154, subtracts the B operand from the A and outputs the difference on line 152. The output on line 152 represents the difference between the number of shift pulses on line 252 and the search start point in condensed tab rack memory 62.

The highest, or maximum, address in condensed tab rack memory 62 is hardwired on line 284 and is the B operand for comparator 280. The output of comparator 280 is CNOTFIND signal on line 148. The CCOUNT signal on line 152 is the output of arithmetic unit 278 which is activated by the CFIND signal on line 154.

Comparator 262 indicates with a pulse on line 264 when a one bit is found in condensed tab rack memory 62. If this bit position is encountered beyond the search start point indicated on line 112 as determined by comparator 274 AND gate 268 is made which activates line 154 thus indicating that an "ON" bit was found in condensed tab rack memory 62. When this occurs, arithmetic unit 278 is activated to subtract the start point on line 112 from the count value in counter 270 yielding the number of condensed tab rack bits from the starting point. If no "ON" bit is found then the count value in counter 270 will exceed that of the maximum size of the condensed tab rack memory 62 as indicated on line 284. Thus comparator 280 has an output pulse on line 148 indicating that no more tabs occur in basic tab rack memory 60.

While our invention has been particularly shown and described with reference to a preferred embodiment, it will be understood by those skilled in the art that various changes in form and detail may be made without departing from the spirit and scope of the invention.

What is claimed is:

1. In a printer having horizontal means for moving a carrier through a plurality of escapement positions, means for tabulating said carrier to at least a predetermined one of said escapement positions,
   storage means for storing a sequence of bit positions each respectively corresponding to one of said escapement positions, and
   means for storing a bit representative of a tab-to position only at each bit position corresponding to a predetermined tab-to position, said means for tabulating comprising
   means for accessing only those segments containing a bit representative of a tab-to position.

2. The printer of claim 1 wherein the storage of a "one" bit is representative of a tab-to position and said segments are bytes.

3. In a high speed printer including a print element carrier, improved electronic tab rack apparatus comprising:
   first storage means arranged in multi-bit blocks for storing tab stop locations;
   second storage means having one bit corresponding to each multi-bit block in said first storage means;
   means for storing in said first storage means tab stop locations;
   means for storing an indication in a bit in said second storage means when a corresponding block in said first storage means contains at least one tab stop location; and
   means for directly accessing in said first storage means only those blocks containing tab stop locations.

4. The apparatus of claim 3 wherein said accessing means includes means for searching said second storage means for the next entry indicating a corresponding block in said first storage means.

5. A method of locating the next tab stop during a high speed print operation in a printer having a basic tab rack in an improved manner including the steps of:
   structuring at the time a set of tab stops is entered in the basic tab rack, a condensed tab rack having a single bit entry corresponding to a multi-bit block of the basic tab rack where said single bit is "ON" if at least one bit in said multi-bit segment of said basic tab rack is "ON";
   upon receiving a tab command, decoding current escapement position to determine search start point in both the basic and condensed tab racks;
   searching the currently accessed basic tab rack block;
   searching the remainder of the condensed tab rack, if no other tab stop is found in the currently accessed basic tab rack block, until the next "ON" bit is found;
   decoding the address of the "ON" bit in the condensed tab rack to a block address in the basic tab rack;
   retrieving the corresponding block from the basic tab rack;
   searching the retrieved block for the tab stop;
   calculating the tab-to location as a function of the (1) search of the currently accessed basic tab rack, (2) search of the condensed tab rack, and (3) the search of the retrieved block.

* * * * *